(12) United States Patent
Viitaniemi et al.

(10) Patent No.: US 7,765,417 B2
(45) Date of Patent: Jul. 27, 2010

(54) EXTERNAL CONTROL OF A MULTI-MODE CONTROLLER

(75) Inventors: Pekka K. Viitaniemi, Espoo (FI); Raimo Ikonen, Salo (FI); Janne Paldan, Oulu (FI)

(73) Assignee: Nokia Corporation, Espoo (FI)

( * ) Notice: Subject to any disclaimer, the term of this patent is extended or adjusted under 35 U.S.C. 154(b) by 805 days.

(21) Appl. No.: 11/644,215

(22) Filed: Dec. 22, 2006

(65) Prior Publication Data
US 2008/0155285 A1    Jun. 26, 2008

(51) Int. Cl.
*G06F 1/32* (2006.01)
*G06F 1/00* (2006.01)

(52) U.S. Cl. .................. 713/320; 713/323; 713/324
(58) Field of Classification Search .................. 713/320
See application file for complete search history.

(56) References Cited

U.S. PATENT DOCUMENTS

| | | | |
|---|---|---|---|
| 5,592,173 A * | 1/1997 | Lau et al. ............... | 342/357.12 |
| 5,842,028 A * | 11/1998 | Vajapey .................. | 713/310 |
| 6,269,449 B1 * | 7/2001 | Kocis ..................... | 713/310 |
| 6,381,705 B1 | 4/2002 | Roche .................... | 713/601 |
| 6,408,396 B1 * | 6/2002 | Forbes .................... | 713/323 |
| 6,892,315 B1 | 5/2005 | Williams ................. | 713/502 |
| 7,058,834 B2 * | 6/2006 | Woods et al. ............ | 713/324 |
| 2003/0132737 A1 | 7/2003 | Lin ......................... | 323/282 |
| 2004/0221187 A1 | 11/2004 | Durand et al. ........... | 713/300 |
| 2004/0250147 A1 * | 12/2004 | Chang .................... | 713/323 |

FOREIGN PATENT DOCUMENTS

FR    2832565 A    5/2003

\* cited by examiner

*Primary Examiner*—Suresh K Suryawanshi
(74) *Attorney, Agent, or Firm*—Harrington & Smith

(57) ABSTRACT

An apparatus including an electrical energy storage device arranged to provide an output voltage that decreases with time; a reference clock; and a multi-mode controller having a first mode in which the reference clock is disabled and a second mode in which the reference clock is enabled, the multi-mode controller being operable, when in the first mode, to monitor a voltage provided by the electrical energy storage device and to change the mode of the controller from the first mode to the second mode when the monitored voltage falls beneath a threshold value and being operable, when in the second mode, to enable storage of electrical energy in the electrical energy storage device.

21 Claims, 5 Drawing Sheets

US 7,765,417 B2

EXTERNAL CONTROL OF A MULTI-MODE CONTROLLER

FIELD OF THE INVENTION

Embodiments of the present invention relate to external control of a multi-mode controller. In particular, some embodiments relate to externally controlling a multi-mode controller to exit a sleep mode and enter an operational mode.

BACKGROUND TO THE INVENTION

It is generally desirable to design portable and stand alone electrical apparatus so that they are more efficient than electrical apparatus that is for example connected to a national electrical distribution network.

One approach that has been adopted, for example in Bluetooth devices, is to have apparatus with different modes. For example an apparatus may have a low power consumption sleep mode and also a high power consumption operational mode. Such apparatus typically remain in the sleep mode until some action is required which requires the apparatus to enter the operational mode.

When an apparatus is in an operational mode its power consumption is significantly greater than when it is in a sleep mode. The overall power consumption of an apparatus can therefore be most effectively reduced by improving the efficiencies of the operational mode of the apparatus.

The inventors have additionally recognized that significant advantages may also be obtained by improving the power consumption efficiencies of the sleep mode.

BRIEF DESCRIPTION OF THE INVENTION

The inventors have realized that it would be desirable to switch off or disable electrical power consuming components in the apparatus when it is in the sleep mode. A reference clock is one example of such a component. However, the inventors have additionally recognized that a problem arises if, for example, a component such as the reference clock is disabled. The apparatus may no longer have important functionality such as, for example, a time reference. Without a time reference, there is no obvious mechanism by which to wake up the apparatus and let it change modes from the sleep mode to the operational mode.

Embodiments of the present invention therefore enable an electrical energy storage device to provide an external wake up signal. This allows the apparatus to wake up without requiring a reference clock. Components such as a reference clock may therefore be disabled to reduce power consumption.

According to an embodiment of the invention there is provided an apparatus comprising: an electrical energy storage device arranged to provide an output signal that varies with time;

a reference clock; and a multi-mode controller having a first mode in which the reference clock is disabled and a second mode in which the reference clock is enabled, the multi-mode controller being operable, when in the first mode, to monitor a signal provided by the electrical energy storage device and to change the mode of the controller from the first mode to the second mode when the monitored signal reaches a threshold value.

The output signal varies in a known manner. For example, it may monotonically decrease or increase. This enables the output signal to be used as a timing reference.

According to an embodiment of the invention there is provided a method comprising: entering a first low-power sleep mode; monitoring a signal provided by an electrical energy storage device; changing the mode from the first low-power sleep mode to a second higher power operational mode when the monitored signal reaches a threshold value.

According to one embodiment of the invention there is provided a computer program comprising computer program instructions which when loaded into a processor enable the processor to operate as a multi-mode controller that is operable to: enter a first low-power sleep mode; monitor a signal provided by an electrical energy storage device; change the mode from the first low-power sleep mode to a second higher power operational mode when the monitored signal reaches a threshold value.

The electrical energy storage device may be primed before the apparatus switches from the operational mode to the sleep mode by storing energy in the electrical storage device. The electrical energy storage device therefore operates as a form of timing reference but not as a reference clock.

BRIEF DESCRIPTION OF THE DRAWINGS

For a better understanding of the present invention reference will now be made by way of example only to the accompanying drawings in which like reference numbers are used to label like features.

DETAILED DESCRIPTION OF EMBODIMENTS OF THE INVENTION

Figure 1:
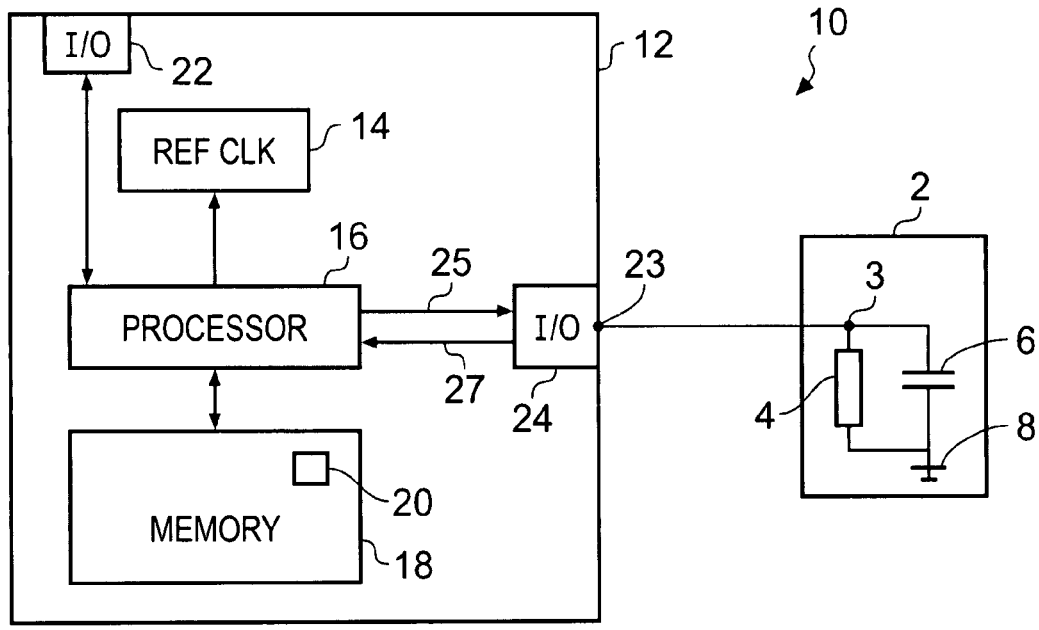
FIG. 1 schematically illustrates an apparatus comprising a multi-mode controller that is connected to an electrical energy storage device.
Figure 2:
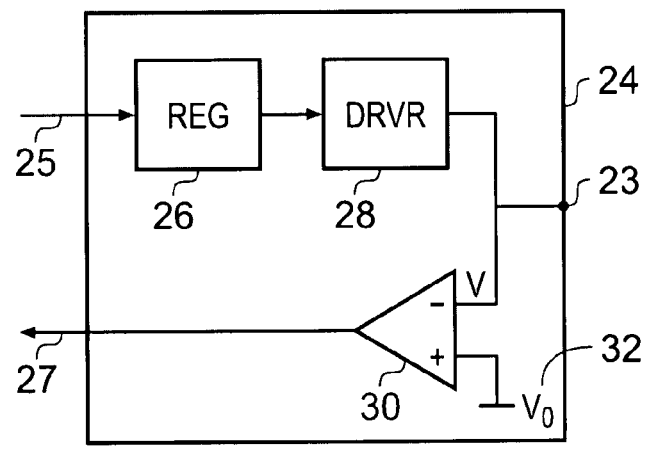
FIG. 2 schematically illustrates a second input/output interface

The FIGS. 1 and 2 illustrate an apparatus 10, 40 comprising: an electrical energy storage device 2 arranged to provide an output signal (voltage V) that varies (decreases) with time; a reference clock 14; and a multi-mode controller 12 having a first mode in which the reference clock 14 is disabled and a second mode in which the reference clock 14 is enabled, the multi-mode controller 12 being operable, when in the first mode, to monitor the output signal (voltage V) provided by the electrical energy storage device 2 and to change the mode of the controller 12 from the first mode to the second mode when the monitored signal (voltage V) reaches (falls beneath) a threshold value ($V_o$) and being operable, when in the second mode, to enable storage of electrical energy in the electrical energy storage device 2.

FIG. 1 schematically illustrates an apparatus 10 comprising a multi-mode controller 12 that is connected to an electrical energy storage device 2.

In this particular embodiment, the multi-mode controller 12 comprises a reference clock 14, a processor 16, a memory 18 storing a computer program 20, a first input/output interface 22 and a second input/output interface 24 that has a pin 23.

The reference clock 14 is a component that provides a stable clocked output. That is a component that typically provides a bi-stable output voltage that periodically and discretely steps between a first voltage level and a second voltage level and the periods of time at which the output voltage is at the first and/or second voltage levels is significantly greater than the time required to switch between the first and second voltage levels. The reference clock 14, as is known to the person skilled in the art, is typically used by electronic components to, for example, enable synchronization of actions.

The processor 16 is connected to provide input/output to the first input/output interface 22 and also to the second input/output interface 24. The processor 16 is also connected to read from the memory 18 and to write to the memory 18.

The multi-mode controller 12 has a first low power consumption sleep mode and also a second higher power consumption operational mode. The processor 16 controls the transitions between the first sleep mode and the second operational mode.

The electrical energy storage device 2 has a node 3 which is connected to the pin 23 of the multi-mode controller 12. The electrical energy storage device 2 stores energy during at least a portion of the time during which the multi-mode controller 12 is in the second operational mode, such that when the multi-mode controller 12 changes from the second operational mode to the first sleep mode energy has been stored in the electrical energy storage device 2. The electrical energy storage device 2 is arranged so that it is lossy, that is, electrical energy is lost from the electrical energy storage device 2 so that the energy stored in it diminishes with time during the first sleep mode of the multi-mode controller. As the energy diminishes, the signal provided by the node 3 changes. This changing signal is used as an external trigger to force the multi-mode controller 12 to wake up from the sleep mode and enter the operational mode.

In the example embodiment illustrated in FIG. 1, the electrical energy storage device 2 comprises a parallel RC circuit. A resistor 4 and a capacitor 6 are connected in parallel between the node 3 and ground 8. In this embodiment, during the operational mode of the multi-mode controller 12, the pin 23 is used to provide a voltage at the node 3 of the electrical energy storage device 2. This voltage charges the capacitor 6. When the multi-mode controller 2 enters the low power mode the pin 23 is used to monitor the voltage at the node 3 of the electrical energy storage device 2. The energy stored in the capacitor 6 diminishes as is known in the art via a continuously and monotonically decreasing discharge current to ground 8. The voltage at the node 3 also continuously and monotonically decreases as an exponential function of time.

Figure 9A:
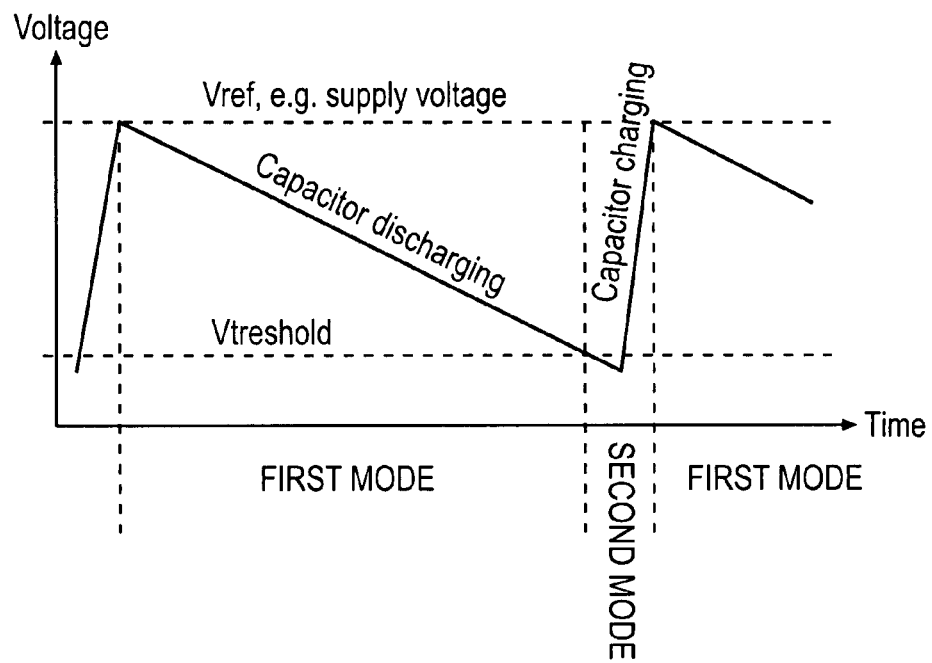
FIGS. 9A, 9B, 9C and 9D respectively illustrate the output voltages for the different electrical energy storage devices illustrated in FIGS. 1, 6, 7 and 8.

As schematically illustrated in FIG. 9A, the output voltage is decreasing (discharge), during the first mode and is increasing during the second mode.

FIG. 2 illustrates the second input/output interface 24 in more detail. An input signal 25 is provided by the processor 16 when the multi-mode controller 12 is in the second operational mode. The signal 25 is a digital signal which is stored in a register 26 and then used by driver 28 to place a voltage $V_i$ on the pin 23. The size of the voltage $V_i$ is controlled by the input signal 25.

When the multi-mode controller 12 is in the first sleep mode, the voltage at the pin 23 is sensed by analogue comparator 30. The comparator 30 operates as a simple analogue to digital converter by creating a digital output signal 27 to the processor 16 when the analogue voltage at the pin 23 falls beneath a threshold $V_0$ 32.

Figure 4:
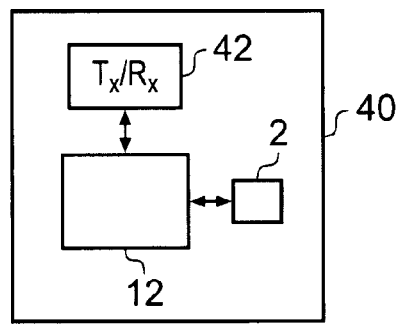
FIG. 4 schematically illustrates the multi-mode controller illustrated in FIG. 1 housed in a radio transceiver module or housed in a portable electronic device.

FIG. 4 illustrates one application of the multi-mode controller 12 illustrated in FIG. 1. In this example, a module 40 houses the multi-mode controller 12, the electrical energy storage device 2 and also a radio transceiver 42. In this example, the module 40 is an RFID reader module and the transceiver 42 is used to poll RFID tags and detect the responses. The multi-mode controller 12, when in the operational mode, is operable to control the transceiver 42 to poll tags and to interpret the responses. However, when the multi-mode controller 12 is in the first sleep mode, the radio transceiver 42 is not operational to save power.

In other embodiments, a portable electronic device 40, instead of a module, may house the multi-mode controller 12.

Figure 5:
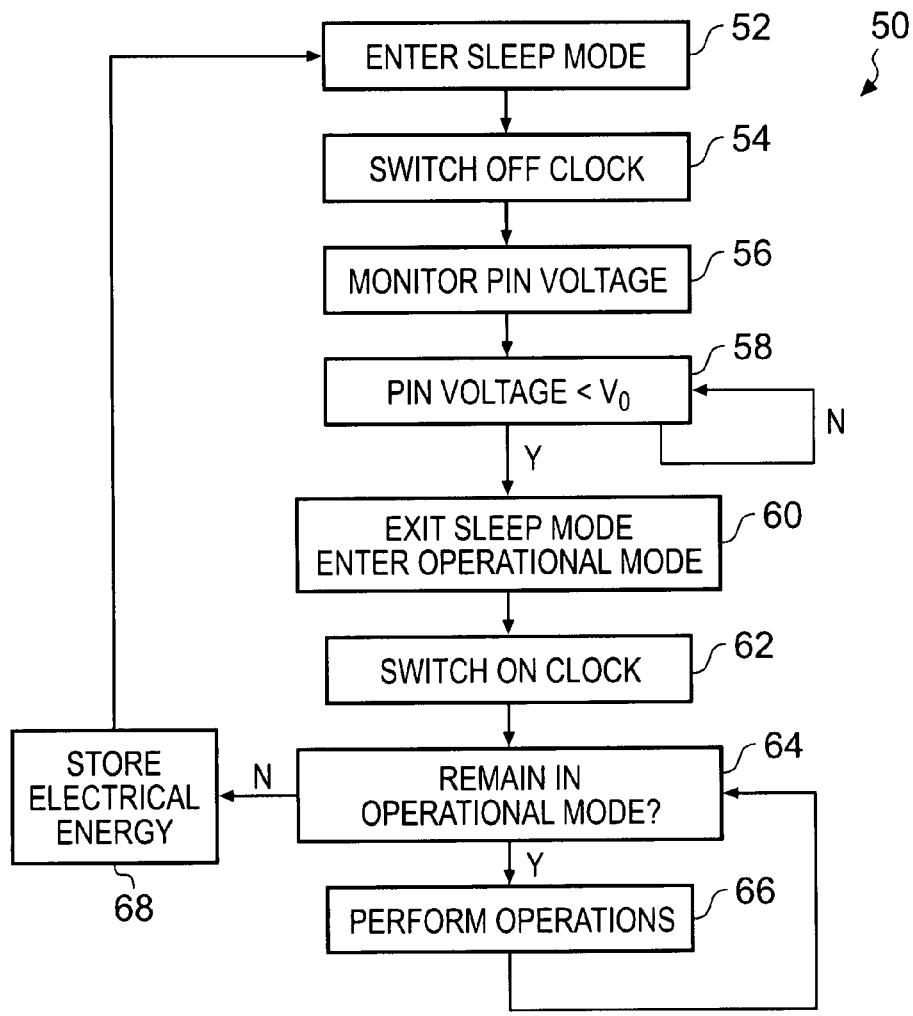
FIG. 5 illustrates a number of blocks that may represent steps in a method or, alternatively, represent code portions of a computer program.

The operation of the apparatus 10 will now be described with reference to FIG. 5. The figure illustrates a number of blocks that may represent steps in a method 50 or, alternatively, represent code portions of the computer program 20.

At block 52, the multi-mode controller 12 enters the sleep mode. Next, at block 54, the multi-mode controller 12 switches off the reference clock 14 and/or other components. Next, at block 56, the processor 16 monitors the input provided by the second input/output interface 24 to detect a signal 27 from the analogue comparator 30. If the voltage at the pin 23 drops beneath the threshold $V_0$ then block 60 is entered. At block 60, the multi-mode controller 12 exits the sleep mode and enters the operational mode. Next, at block 62 the multi-mode controller 12 switches on the reference clock 14 and/or the other discrete components. Next at block 64, the multi-mode controller 12 determines whether or not it should remain in the operational mode. If it is decided to remain in the operational mode, then block 66 is entered and operations are performed. After performing the operations block 64 is re-entered and a further decision of whether to remain in the operational mode or not is taken.

If it is decided not to remain in the operational mode at block 64, then block 68 is entered and the processor uses the signal 25 to store energy at the electrical energy storage device 2. The multi-mode controller then enters the sleep mode at block 52. Alternatively, block 68 may be entered in parallel to block 62.

In the example illustrated in FIG. 4, it may be desirable for the multi-mode controller to effect tag poling every n seconds. However, it is likely that the time constant of the parallel RC circuit will be of the order of milliseconds. Typically therefore the multi-mode controller will remain in the sleep mode for a period of approximately of the order 10 milliseconds before re-entering the operational mode. The multi-mode controller 12 may therefore be arranged to keep a counter that counts the number of times the operational mode has been entered since the last polling for tags. When the count reaches a threshold count value e.g. 100 n then the multi-mode controller will, at block 64, decide to remain in the operational mode. The actions that it would perform would be tag poling and then resetting the counter. However if the counter is other than the threshold count value at block 64 then the multi-mode controller would decide not to remain in the operational mode.

An additional refinement may be provided by enabling the multi-mode controller 12 to delay recharging the electrical energy storage device 2 when the operational mode is entered. There is therefore a period of time during which the multi-mode controller 12 is operational and the electrical output voltage provided at node 3 of the electrical energy storage device 2 continues to decrease. The multi-mode controller 12 is therefore able to sample this decreasing voltage via pin 23 and determine characteristics of the electrical energy storage device 2. For example if the electrical energy storage device is a parallel RC circuit, the multi-mode controller 12 can, by sampling the decreasing output voltage at node 3, calculate the time constant for the parallel RC circuit. The multi-mode controller 12 may use this knowledge of the RC time constant, a knowledge of the voltage level $V_i$ to which the capacitor 6 is charged when the first sleep mode is entered and a knowledge of the threshold $V_0$ to estimate the period of time t for which the sleep mode has been entered (t=RC Ln[$V_i/V_o$]. This value of t may be used to adjust the threshold count value at which block 66 is entered or to vary $V_i$ by varying the signal 25 provided to the second input/output interface 24.

In one embodiment, the multi-mode controller 12 may be implemented using an ATMEL ATmeaga64L micro-controller and the PE4/INT4 6 pin may be used as pin 23.

The memory 18 stores computer program instructions 20 that control the operation of the multi-mode controller 12 when loaded into the processor 16. The computer program instructions 20 provide the logic and routines that enables the electronic device to perform the methods illustrated in FIG. 5.

The computer program instructions may arrive at the multi-mode controller 12 via an electromagnetic carrier signal or be copied from a physical entity 34 such as a computer program product, a memory device or a record medium such as a CD-ROM or DVD.

Figure 6:
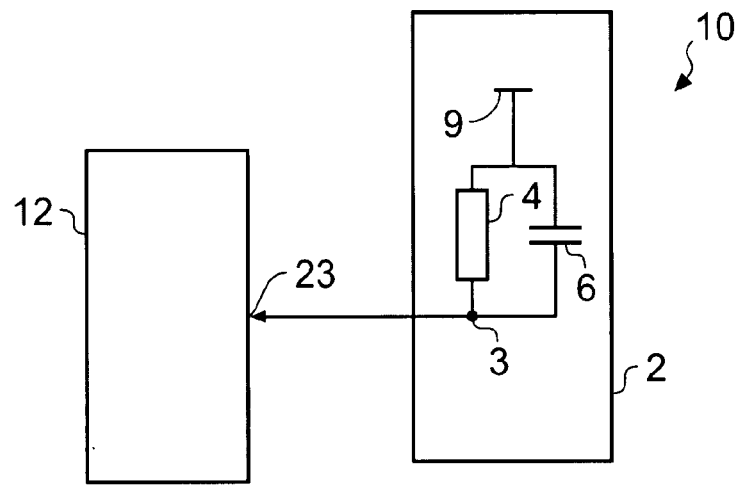
FIGS. 6, 7 and 8 schematically illustrate embodiments of the apparatus that use different electrical energy storage devices than the embodiment illustrated in FIG. 1.

The FIG. 6 illustrates an apparatus 10 comprising: an electrical energy storage device 2 arranged to provide an output signal (voltage V) that varies (increases) with time; a reference clock 14; and a multi-mode controller 12 having a first mode in which the reference clock 14 is disabled and a second mode in which the reference clock 14 is enabled, the multi-mode controller 12 being operable, when in the first mode, to monitor the output signal (voltage V) provided by the electrical energy storage device 2 and to change the mode of the controller 12 from the first mode to the second mode when the monitored signal (voltage V) reaches (rises above) a threshold value ($V_o$). The multi-mode controller 12 being operable, when in the second mode, to enable storage of electrical energy in the electrical energy storage device 2.

Figure 9B:
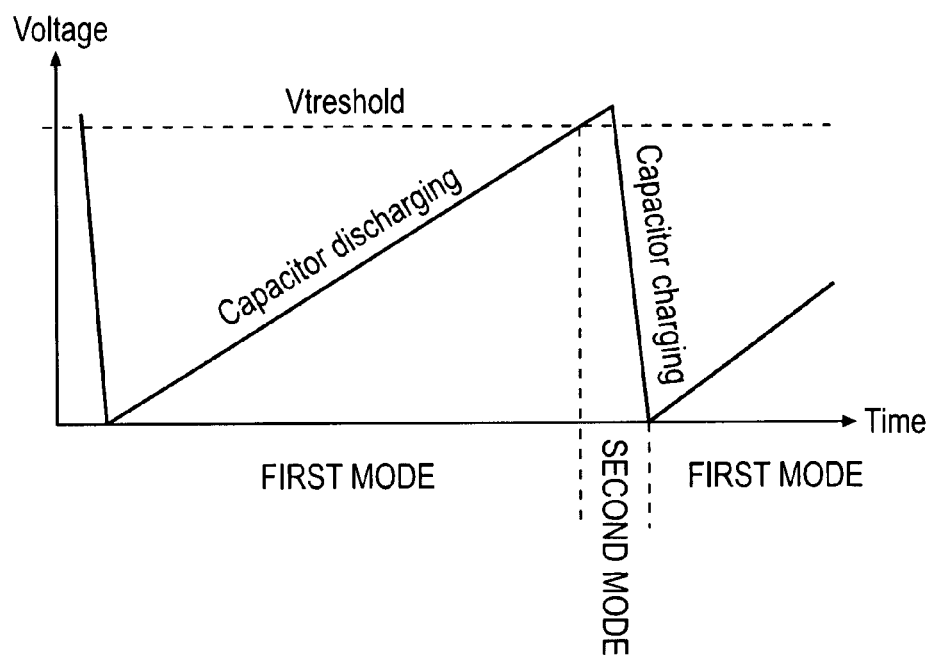

The apparatus 10 illustrated in FIG. 6, differs from that illustrated in FIG. 1 in that the output voltage is rising (during discharge), during the first mode and is decreasing during the second mode. This is illustrated in FIG. 9B.

Figure 3:
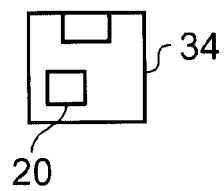
FIG. 3 schematically illustrates computer program instructions embodied on a physical entity.

The parallel RC circuit is, in this implementation, connected between output node 3 and a rail voltage $V_{ref}$. In the first mode, the pin 23 is used to monitor the voltage at node 3 as the capacitor 6 begins to discharge. As the capacitor discharges the voltage at the output node 3 increases until it exceeds a threshold measured by, for example, an analogue comparator 30 similar to that illustrated in FIG. 3 but with the polarity of its inputs reversed.

Figure 7:
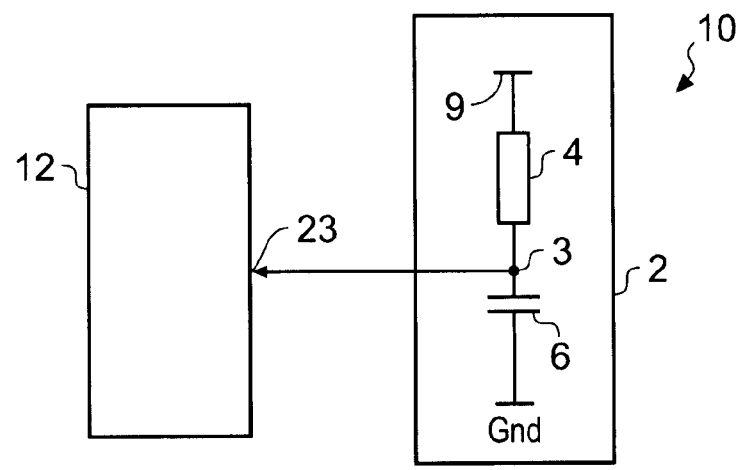

The FIG. 7 illustrates an apparatus 10 comprising: an electrical energy storage device 2 arranged to provide an output signal (voltage V) that varies (increases) with time; a reference clock 14; and a multi-mode controller 12 having a first mode in which the reference clock 14 is disabled and a second mode in which the reference clock 14 is enabled, the multi-mode controller 12 being operable, when in the first mode, to monitor the output signal (voltage V) provided by the electrical energy storage device 2 and to change the mode of the controller 12 from the first mode to the second mode when the monitored signal (voltage V) reaches (rises above) a threshold value ($V_o$). The multi-mode controller 12 being operable, when in the first mode, to enable storage of electrical energy in the electrical energy storage device 2.

Figure 9C:
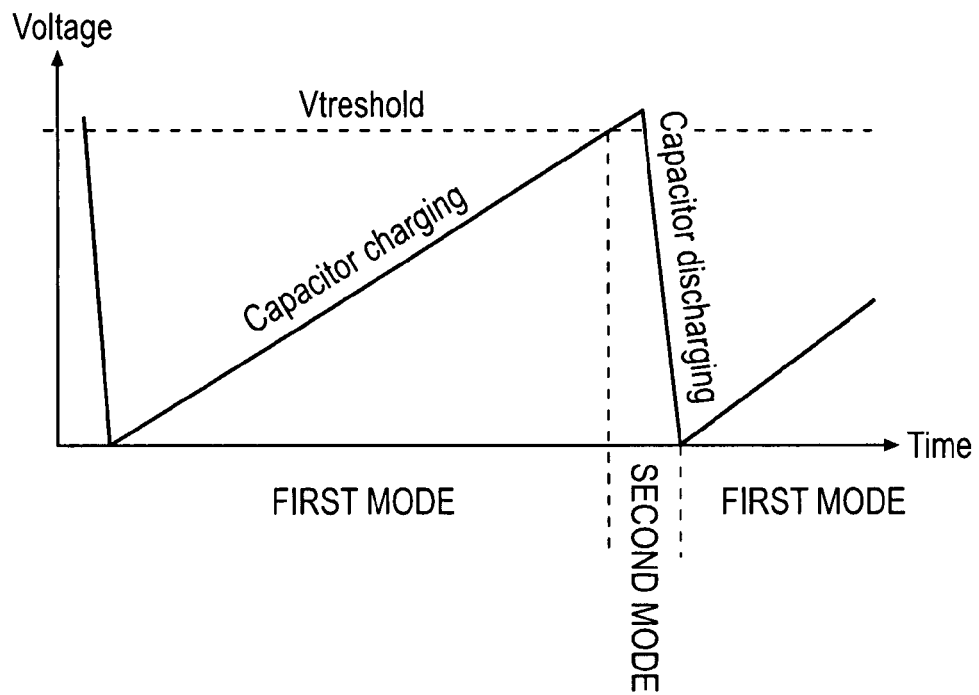

The apparatus 10 illustrated in FIG. 7, differs from that illustrated in FIG. 1 in that the output voltage is charging rather than discharging during the first mode and is discharged during the second mode. This is illustrated in FIG. 9C.

The serial RC circuit is, in this implementation, connected between output node 3 and a rail voltage $V_i$. In the first mode, the pin 23 is used to monitor the voltage at node 3 as the capacitor 6 begins to charge. As the capacitor charges the voltage at the output node 3 increases until it exceeds a threshold measured by, for example, an analogue comparator 30 similar to that illustrated in FIG. 3 but with the polarity of its inputs reversed.

Figure 8:
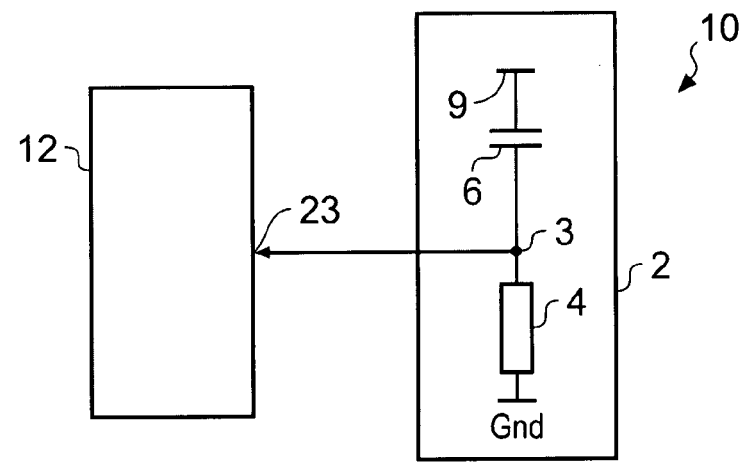

The FIG. 8 illustrates an apparatus 10 comprising: an electrical energy storage device 2 arranged to provide an output signal (voltage V) that varies (decreases) with time; a reference clock 14; and a multi-mode controller 12 having a first mode in which the reference clock 14 is disabled and a second mode in which the reference clock 14 is enabled, the multi-mode controller 12 being operable, when in the first mode, to monitor the output signal (voltage V) provided by the electrical energy storage device 2 and to change the mode of the controller 12 from the first mode to the second mode when the monitored signal (voltage V) reaches (decreases below) a threshold value ($V_o$). The multi-mode controller 12 being operable, when in the first mode, to enable storage of electrical energy in the electrical energy storage device 2.

Figure 9D:
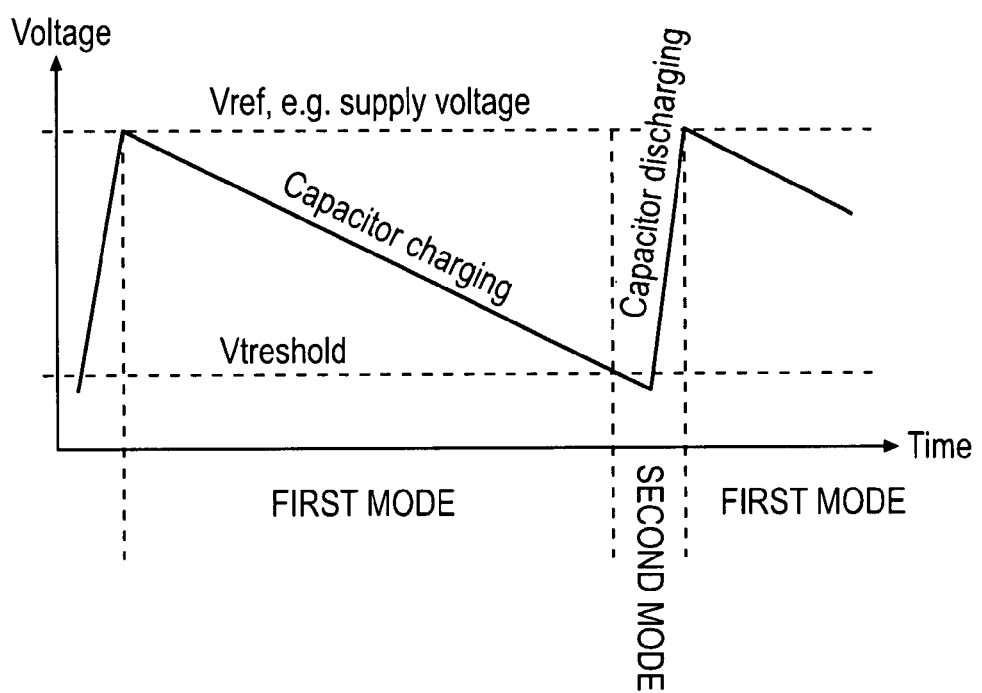

The apparatus 10 illustrated in FIG. 8, differs from that illustrated in FIG. 1 in that the output voltage is charging rather than discharging during the first mode and is discharged during the second mode. This is illustrated in FIG. 9D.

The serial RC circuit is, in this implementation, connected between output node 3 and a rail voltage $V_i$. In the first mode, the pin 23 is used to monitor the voltage at node 3 as the capacitor 6 begins to charge. As the capacitor charges the voltage at the output node 3 decreases until it goes below a threshold measured by, for example, an analogue comparator 30 similar to that illustrated in FIG. 3.

Although embodiments of the present invention have been described in the preceding paragraphs with reference to various examples, it should be appreciated that modifications to the examples given can be made without departing from the scope of the invention as claimed. For example, although the multi-mode controller 12 is illustrated as a programmable processor in FIG. 1, in other embodiments it may be implemented in hardware as an application specific integrated circuit or similar. For example, although a parallel RC circuit is used as an example of an electrical energy storage device 2, other types of devices are possible such as, for example, a series RC circuit.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:
1. An apparatus comprising:
   an electrical energy storage device arranged to provide at a pin an output signal that varies with time;
   a reference clock; and
   a multi-mode controller having a first mode in which the reference clock is disabled and a second mode in which the reference clock is enabled, the multi-mode controller being operable, when in the first mode, to monitor the output signal provided by the electrical energy storage device and to change the mode of the controller from the first mode to the second mode when the monitored signal reaches a threshold value; wherein the multi-mode controller is further operable, when in the second mode, to use the pin to store electrical energy in the electrical energy storage device.

2. An apparatus as claimed in claim 1, wherein the multi-mode controller comprises the pin coupled to the electrical energy storage device.

3. An apparatus as claimed in claim 2, wherein the multi-mode controller, when in the first mode, interprets a variation in the signal applied to the pin beyond the threshold value as an interrupt.

4. An apparatus as claimed in claim 2, wherein the pin is a level sensitive multipurpose I/O pin.

5. An apparatus as claimed in claim 2, wherein the multi-mode controller provides a digital output signal on the pin in the second mode.

6. An apparatus as claimed in claim 2, wherein the multi-mode controller monitors an analogue input on the pin in the first mode.

7. An apparatus as claimed in claim 1, wherein the first mode is a low power consumption sleep mode and second mode is a higher power consumption operational mode and wherein the multi-mode controller is operable to respond to the variation of the monitored signal beyond the threshold by waking-up from the sleep mode and entering the operational mode.

8. An apparatus as claimed in claim 1, wherein the electrical energy storage device comprises a capacitor.

9. An apparatus as claimed in claim 1, wherein the electrical energy storage device comprises an RC circuit.

10. An apparatus as claimed in claim 1, wherein the multi-mode controller is further operable, when in the second mode, to enter the first mode.

11. An apparatus as claimed in claim 10, wherein the multi-mode controller is operable to enter the first mode from the second mode according to a schedule.

12. An apparatus as claimed in claim 1, wherein the multi-mode controller is operable when in the second mode to determine whether an action is required and if an action is not required to return to the first mode.

13. An apparatus as claimed in claim 1, wherein multi-mode controller is operable to count transitions from one of the first and second modes to the other of the first and second modes.

14. An apparatus as claimed in claim 1, wherein the multi-mode controller is operable, after changing from the first mode to the second mode, to measure the varying signal provided by the electrical energy storage device and thereby estimate the period of time the controller has been in the first mode.

15. An apparatus as claimed in claim 1, wherein the output signal decreases with time and the multi-mode controller is operable, when in the second mode, to enable storage of electrical energy in the electrical energy storage device.

16. An apparatus as claimed in claim 1, the multi-mode controller is operable, when in the first mode, to enable release of electrical energy from the electrical energy storage device as the output signal.

17. An apparatus as claimed in claim 1, wherein the multi-mode controller is operable, when in the second mode, to enable release of electrical energy from the electrical energy storage device.

18. An apparatus as claimed in claim 1 embodied in a self-contained module.

19. An apparatus as claimed in claim 1 embodied in an RFID reader module.

20. A method comprising:
    entering a multi-mode controller in a first low-power sleep mode;
    monitoring a signal provided by an electrical energy storage device;
    changing the mode from the first low-power sleep mode to a second higher power operational mode when the monitored signal reaches a threshold value; and
    using a pin coupled to the electrical energy storage device to both monitor the signal provided by the electrical energy storage device in the first low-power sleep mode and to provide electrical energy to the electrical energy storage device in the second higher power operational mode.

21. A computer program product comprising a memory device storing computer program instructions which when loaded into a processor enable the processor to operate as a multi-mode controller that is operable to:
    enter a first low-power sleep mode;
    monitor a signal provided by an electrical energy storage device;
    change the mode from the first low-power sleep mode to a second higher power operational mode when the monitored signal reaches a threshold value; and
    using a pin coupled to the electrical energy storage device to both monitor the signal provided by the electrical energy storage device in the first low-power sleep mode and to provide electrical energy to the electrical energy storage device in the second higher power operational mode.

* * * * *